United States Patent [19]
Long, Jr.

[11] Patent Number: 6,070,766
[45] Date of Patent: *Jun. 6, 2000

[54] TAMPER EVIDENT CLOSURE

[75] Inventor: Charles J. Long, Jr., New Castle, Pa.

[73] Assignee: International Plastics and Equipment Corporation, New Castle, Pa.

[ * ] Notice: This patent is subject to a terminal disclaimer.

[21] Appl. No.: 08/948,342

[22] Filed: Oct. 9, 1997

Related U.S. Application Data

[63] Continuation-in-part of application No. 08/927,311, Sep. 11, 1997, which is a continuation-in-part of application No. 08/749,488, Nov. 15, 1996, which is a continuation-in-part of application No. 08/603,148, Feb. 15, 1996, abandoned.

[51] Int. Cl.$^7$ .......................................... B67D 5/06
[52] U.S. Cl. ........................ 222/153.07; 222/182; 222/525
[58] Field of Search ..................... 222/153.05, 153.06, 222/153.07, 182, 525; 215/256, 216

[56] References Cited

U.S. PATENT DOCUMENTS

| | | | |
|---|---|---|---|
| 2,789,717 | 4/1957 | Demke | 215/320 |
| 2,805,001 | 9/1957 | Biederman | 222/525 |
| 2,998,902 | 9/1961 | Thomas et al. | 222/525 |
| 3,372,833 | 3/1968 | Baranne | 222/525 |
| 4,746,035 | 5/1988 | Anderson et al. | 222/182 |
| 4,815,617 | 3/1989 | Cullum | 215/256 |
| 4,934,546 | 6/1990 | Markley | 215/256 |
| 5,104,008 | 4/1992 | Crisci | 222/525 |
| 5,285,933 | 2/1994 | Gentes et al. | 222/525 |
| 5,456,374 | 10/1995 | Beck | 222/153.06 |
| 5,465,876 | 11/1995 | Crisci | 222/525 |
| 5,472,120 | 12/1995 | Stebick et al. | 222/525 |
| 5,588,562 | 12/1996 | Sander et al. | 222/525 |
| 5,655,685 | 8/1997 | Carr et al. | 222/525 |
| 5,662,247 | 9/1997 | Rapchak et al. | 222/525 |
| 5,680,965 | 10/1997 | Beck | 222/525 |
| 5,810,185 | 9/1998 | Groesbeck | 222/525 |
| 5,829,611 | 11/1998 | Beck | 215/256 |

*Primary Examiner*—Joseph A. Kaufman
*Attorney, Agent, or Firm*—Cohen & Grigsby, P.C.

[57] ABSTRACT

The present invention relates to a substantially leak proof tamper-evident container closure that combines a reusable, push-pull spout with a snap-on tamper evident closure which is substantially tamper proof. The closure has first and second locking members characterized by the first locking member having an inward flange with an upturned locking edge forming an annular groove in the flange. The push pull resealable pour spout with an opening therein which is partially closed by a second top having a secondary opening therein and a plug space thereabove with upwardly angled legs formed integral with the closure. Integrated into the periphery of the secondary opening is at least one and preferably two annular flanges. The annular flanges engage and create a sealing contact with the annular surface of the plug to provide a seal which is leak proof after many uses. The lower edge of the push-pull pour spout contains a tamper evident band to indicate if the push-pull pour spout has been "tampered" with even in situations where the container closure has not been disturbed. The present invention also optionally provides a dust cover which encloses the push-pull pour spout closure when inserted on the container. The dust cover may be optionally provided with a tamper-evident sealing band which remains intact upon initial installation of the dust cover onto the container and which is broken when the dust cover is initially disturbed. When the dust cover is provided with a tamper-evident sealing band, the use of a band on the lower edge of the pour spout closure for providing tamper-evidency may be eliminated.

41 Claims, 8 Drawing Sheets

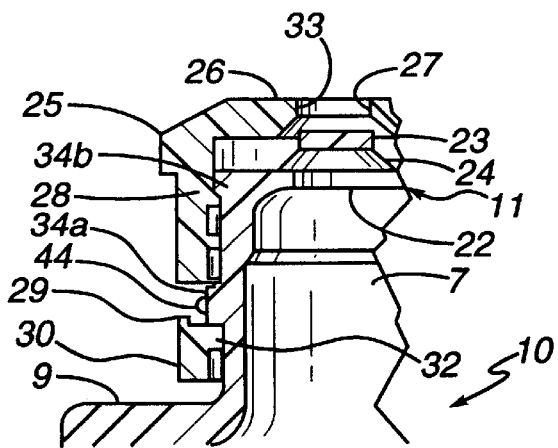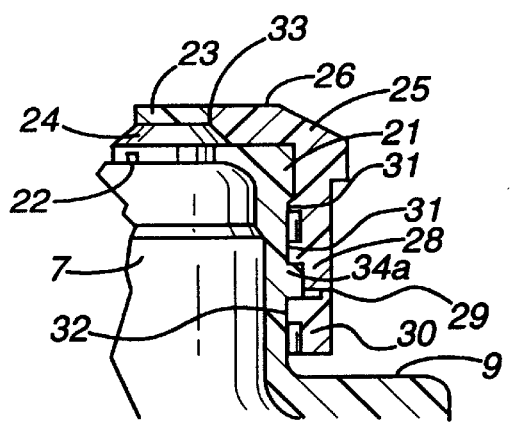
FIG. 5  FIG. 6
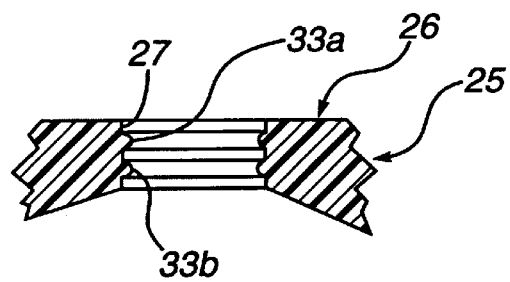
FIG. 5A
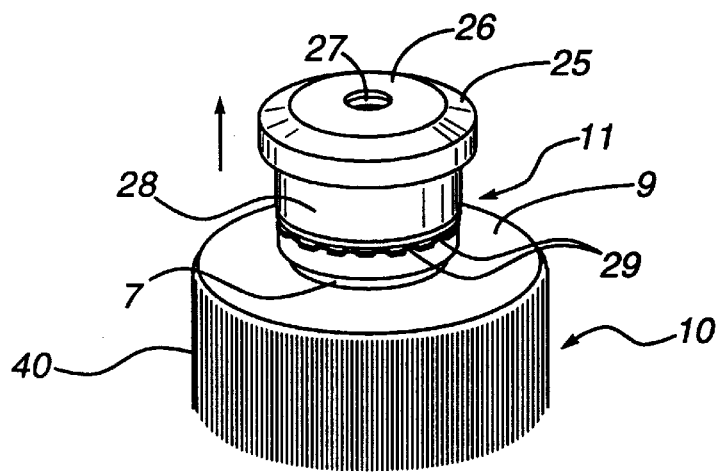
FIG. 7

TAMPER EVIDENT CLOSURE

CROSS-REFERENCE

This application is a continuation-in-part of U.S. patent application Ser. No. 08/927,311 filed Sep. 11, 1997, which is a continuation-in-part of U.S. patent application Ser. No. 08/749,488 filed on Nov. 15, 1996, which is a continuation-in-part of U.S. patent application Ser. No. 08/603,148 filed on Feb. 15, 1996 (abandoned).

FIELD OF THE INVENTION

The present invention relates to a substantially leak proof tamper-evident container closure that combines a reusable, push-pull spout with a snap-on tamper evident closure which is substantially tamper proof.

BACKGROUND OF THE INVENTION

Prior art container closures having a pour spout or the like are disclosed in U.S. patent application Ser. No. 08/332,140 (issued as U.S. Pat. No. 5,588,562) which is the priority document for International Patent Application No. PCT/IB95/01105 (published May 9, 1996 under International Publication No. WO 96/13442), U.S. patent application Ser. No. 08/633,225 filed Apr. 16, 1996 (abandoned), U.S. patent application Ser. No. 08/687,149 filed Jul. 24, 1996 (now U.S. Pat. No. 5,862,953), U.S. patent application Ser. No. 08/838,133 filed on Apr. 15, 1997, U.S. patent application Ser. No. 08/927,743 filed Sep. 11, 1997, and U.S. Pat. Nos. 5,104,008 and 5,465,876. Some of these prior spout closures provide tamper evidency and have tamper evident pour spouts but have not been leak proof at the spout closure interface. Generally, prior art push-pull spouts that are reusable do not provide effective sealing at the juncture between the spout opening and the plug positioned in the opening when the spout is closed. Because of the very small diameter of the opening and the concern for safety, it is not possible to add non-integrated sealing means. The present invention solves this problem by utilizing a closure plug which combines a circular closure disk with an integral annular skirt depending from the periphery of the disk thereby defining a hollow cavity for the plug interior and increasing the structural flexibility of the plug. The increased structural flexibility provided by the hollow cavity causes inward deformation of the plug skirt upon engagement with annular flanges integrated into the periphery of the spout closure central opening to create a form-fitting leak tight seal. A plurality of circumferentially spaced dimples optionally extend from the exterior wall of the pour spout. These dimples facilitate breaking the frangible elements connecting the tamper evident band to the push-pull pour spout closure. Optionally, one or more continuous or discontinuous locking beads on the pour spout can be configured to engage one or more continuous or discontinuous locking beads on the pour spout closure to provide a structure for securing the pour spout closure to the pour spout the closed position and/or to prevent removal of the pour spout closure from the pour spout in the open position.

The present invention also optionally provides a dust cover which encloses the push-pull pour spout closure when inserted on the container. One example of the use of dust covers as a means for sealing containers is shown in U.S. Pat. No. 5,456,374. The dust cover of the present invention is optionally provided with a tamper-evident sealing band which remains intact upon initial installation of the dust cover onto the container and which is broken when the dust cover is initially disturbed. The purpose of the dust cover is to provide an indication of whether the push-pull pour spout closure has been exposed subsequent to the sealing of the container. When the dust cover is provided with a tamper-evident sealing band, the use of a band on the lower edge of the pour spout closure for providing tamper-evidency may be eliminated.

Snap-on tamper evident closures are also well known in the prior art for use on blow-molded milk containers and on fruit juice bottles. Illustrative of the prior art are U.S. Pat. Nos. 4,934,546, 4,844,268, 4,815,620, 4,589,561, 4,676,389, 4,676,389, 4,593,830, 4,699,268, 4,700,860, 4,202,455, 5,036,991, 3,940,004 and 4,066,182. Generally, these closures are shaped to engage the neck of a thin-walled blow molded plastic bottle used for milk, bottled water or juices. The neck of these bottles is typically formed with an inwardly turned flange at its upper end and includes an upper and lower external locking bead around the circumference of the neck to securely mate the closure thereto. Tamper evident closures of the prior art typically include a circular closure disk with a depending upper annular skirt and a lower depending annular skirt containing a tamper evident tear strip. Positioned on the internal walls of the respective skirt are upper and lower locking beads or flanges which are positioned to engage the external locking beads on the upper and lower portion of the neck of the bottle. Normally, the beads on the closure ride over the beads on the neck and provide "locking" of the closure on the container neck by the beads impeding sliding travel of the closure thereover. In addition, the prior art closures include a valve means depending from the inner surface of the closure disk which is adapted to engage the internal neck portion to create a seal at the mouth of the container. While the prior art snap-on closures provide evidence that a closure has been removed from the container when the tamper-evident band has been removed it is possible to remove many of the commercially available snap-on closures without removing the band. Moreover, when the tamper evident band having the lower locking bead has been removed, these caps do not provide a tight closure or effective seal. The removal of the lower skirt portion along with the tamper evidency deprives the cap of the primary locking means. This is typically not a problem with containers which are not reused, but with containers that are to be used or are not dispensed upon the initial opening the single remaining locking mechanism does not provide a leak proof seal.

Accordingly, it is an object of the present invention to provide a substantially leak proof snap-on tamper evident closure which is substantially tamper proof.

It is a further object of the present invention to provide a first or upper locking means which provides additional locking forces when unauthorized removal is attempted.

It is a further object of the present invention to provide a closure that forms a secure seal upon reuse when the second skirt or tamper evident band is removed from the closure for reuse of the container.

It is a further object of the invention, to provide a closure which is usable on existing neck finishes with little or no modification.

It is a further object of the invention to provide a closure having a first locking member with a reverse internal flange which projects towards the mouth of the neck.

It is a further object of the present invention to improve sealing engagement between the closure and the mating portions of the interior wall of the container neck by including at least one and preferably a plurality of annular sealing beads depending from the outer surface of the closure valve which are compressed against the inner surface of the container neck to form a seal as the closure is snapped onto the container neck.

It is a further object of the present invention to improve sealing engagement between the closure and the mating portions of the exterior wall of the container neck by including one or more annular sealing beads on the interior surface of the closure depending annular skirt.

It is a further object of the present invention to provide an effective seal for a push-pull spout for reusable containers, combined with a snap-on tamper evident closure which provides a secure closure which is substantially tamper proof.

It is a further object of the present invention to provide a substantially leak proof push-pull pour spout for reusable containers, combined with a snap-on tamper evident closure having a first or upper locking means which provides additional locking forces when unauthorized removal is attempted.

It is a further object of the present invention to provide a substantially leak proof push-pull pour spout for reusable containers, combined with a snap-on tamper evident closure having an upturned internal locking flange to lock onto the upper locking bead of the container and having a push-pull resealable tamper evident pour spout.

It is a further object of the present invention to provide a substantially leak proof push-pull pour spout for reusable containers, combined with a snap-on tamper evident closure having a first locking member with a reverse internal flange which projects towards the mouth of the neck.

It is a further object of the present invention to provide a substantially leak proof push-pull pour spout for reusable containers, combined with a snap-on tamper evident closure that forms a secure seal upon reuse when the second skirt or tamper evident band is removed from the closure for reuse of the container.

It is a further object of the present invention to provide a snap-on tamper-evident closure with a reusable push-pull pour spout having a closure plug of increased structural flexibility to provide a more effective leak tight seal.

It is a further object of the present invention to provide a dimple means for facilitating the breakage of frangible elements on the tamper evident band of the push-pull pour spout closure.

It is a further object of the present invention to provide one or more continuous or discontinuous locking beads on the pour spout configured to engage one or more continuous or discontinuous locking beads on the pour spout closure to provide a structure for securing the pour spout closure to the pour spout the closed position and/or to prevent removal of the pour spout closure from the pour spout in the open position.

It is a further object of the present invention to provide a dust cover which encloses the push-pull pour spout closure when inserted on the container.

It is a further object of the present invention to provide a dust cover with a tamper-evident sealing band which encloses the push-pull pour spout closure when inserted on the container.

It is a further object of the present invention to eliminate the need for a band on the lower edge of the pour spout closure to provide tamper-evidency for the pour spout by providing a dust cover with a tamper-evident sealing band which encloses the push-pull pour spout closure when inserted on the container.

It is a further object of the present invention to provide a substantially leak proof push-pull pour spout for reusable containers, combined with a snap-on tamper evident closure which is usable on existing neck finishes with little or no modification.

SUMMARY OF THE INVENTION

The present invention provides a substantially leak proof tamper-evident container closure that may be optionally configured with a reusable, push-pull spout with a snap-on tamper evident secondary closure which is substantially tamper proof.

Generally, the present invention provides a tamper evident snap-on closure for use on containers having a neck finish with first and second (upper and lower) spaced apart external locking beads. Typically the neck includes a mouth with an opening extending therefrom through the bottle neck into the container. An inwardly turned flange at the mouth area of the neck is normally used as a seat for the closure on the neck. The primary (or bottom) portion of the closure of the present invention includes a circular closure disk having a diameter sufficient to cover the mouth of the neck. A first skirt is provided which depends from the periphery of the disk and substantially encompasses an "upper" portion of the neck. Preferably, the first skirt terminates adjacent to and just below the first locking bead on the neck of the container. The first skirt includes an outwardly extending angularly depending sidewall. Preferably, the angle of the sidewall is dimensioned adequate to accommodate the slightly larger neck diameter found on the lower portion of the common blow molded containers. This angle can extend preferably from 30° to 60°, but most preferably it is approximately 45°.

Juxtaposed adjacent to and internal of the first skirt and sidewall is a first locking member which extends radially inward and towards the bottom surface of the closure disk. The first locking member includes a radially extending flange having an edge which forms a groove therewith. The flange is preferably at an angle with a plane normal to the first skirt. Preferably, the first locking member is part of the continuum of the internal surface of the angularly projecting sidewall which defines a "hook" which slides over the locking beads on the neck which placed on the container but which engages the upper locking bead when removal of the cap is attempted.

A second skirt is provided which depends from the angular sidewall and encompasses a lower portion of the neck extending to at least beyond the second external locking bead. The intersection of the angular sidewall and second skirt defines a first tear line which is a zone of reduced material thickness. A second annular locking member is positioned internally of the second skirt to engage the second or lower external locking bead when the closure is positioned on the container. A second tear line is incorporated in the second skirt which extends from the first tear line to the terminus of the second skirt and passes through the second locking member.

A tab member is mounted to the second skirt preferably juxtaposed with the bottom edge of the second skirt and the second tear line. The tab member is connected to but spaced apart from the external surface of the second skirt to afford a grip space so that the user can grab the tab and pull it and the second skirt tearing the second tear line and thereafter the first tear line of the closure. By removing the second skirt, the closure can be removed from the container by pushing upwardly on the angular sidewall.

In a preferred embodiment of the present invention, an annular valve is provided which depends from the bottom surface of the closure disk. The valve is concentrically spaced apart from the first skirt by a distance substantially the same as the inwardly extending flange of the neck finish located at the mouth of the container. In the preferred embodiment, the valve member extends from the bottom of the disk to a point below the first tear line. The valve provides a tight fitting seal upon insertion of the closure onto the bottle preventing any leakage of fluid within the container. Optionally, to improve sealing engagement between valve and the mating portions of the interior wall of the container neck, the closure valve may include at least one and preferably a plurality of annular sealing beads depending from its outer surface which are compressed against the inner surface of the container neck to form a seal as the closure is snapped onto the container neck. Additionally, the interior surface of the closure depending annular skirt may also be configured with one or more annular sealing beads to improve sealing engagement between the annular skirt and the mating portions of the exterior wall of the container neck.

In the bottling operation, the closure is inserted over the neck finish to force the first and second locking members to slide over the first and second external locking beads on the neck. Once seated on the neck, the closure of the present invention cannot be removed until the second skirt is removed. Such removal requires pulling the tamper evident tab from the closure leaving evidence that the container has been "tampered" with. Once the second skirt is removed the closure maintains a liquid tight seal preventing the escape of any fluids contained therein by reason of the reverse basis of first locking member. The edge and groove of the first locking member grips the first locking bead of the neck to prevent unintended removal of the closure. In order for the user to remove the closure it is desirable that user push upwardly on the angular sidewall to release the grip provided by the hook of the first locking member. By so doing, the closure can be removed from the container. Replacing the closure onto the container is facilitated because of the reverse basis of the hook design of the first locking member facilitating the locking member sliding over the first locking bead on the neck. The edge of the groove bends away from the locking beads when the closure is repositioned on the neck thus this same feature prevents an easy reverse direction being taken over that same external locking bead. Accordingly, substantially better tamper evidency is provided as well as a much better seal is afforded upon reuse than found in the prior art.

Optionally, the present invention includes a push pull resealable pour spout with an opening therein which is partially closed by a second top having a secondary opening therein and a plug space thereabove with upwardly angled legs formed integral with the closure. The plug takes the form of a circular closure disk having an integral annular skirt depending from the periphery of the disk that attaches the plug to the angular legs thereby defining a hollow cavity for the plug interior and increasing the structural flexibility of the plug. Integrated into the periphery of the secondary opening is at least one and preferably two annular flanges. The annular flanges engage and create a sealing contact with the annular surface of the plug to provide a form-fitting seal which is leak proof after many uses. In one embodiment of the present invention, the lower edge of the push-pull pour spout contains a tamper evident band to indicate if the push-pull pour spout has been "tampered" with even in situations where the container closure has not been disturbed. A plurality of circumferentially spaced dimples optionally extend from the exterior wall of the pour spout. These dimples facilitate breaking the frangible elements connecting the tamper evident band to the spout closure. Optionally, one or more continuous or discontinuous locking beads on the pour spout can be configured to engage one or more continuous or discontinuous locking beads on the pour spout closure to provide a structure for securing the pour spout closure to the pour spout the closed position and/or to prevent removal of the pour spout closure from the pour spout in the open position.

The present invention also optionally provides a dust cover which encloses the push-pull pour spout closure when inserted on the container. The dust cover may optionally be provided with a tamper-evident sealing band which remains intact upon initial installation of the dust cover onto the container and which is broken when the dust cover is initially disturbed. When the dust cover is provided with a tamper-evident sealing band, the use of a band on the lower edge of the pour spout closure for providing tamper-evidency may be eliminated.

The push-pull pour spout is attached to the container by means of a tamper evident snap-on closure for use on containers having a neck finish with first and second (upper and lower) spaced apart external locking beads. Typically the neck includes a mouth with an opening extending therefrom through the bottle neck into the container. An inwardly turned flange at the mouth area of the neck is normally used as a seat for the closure on the neck.

Other advantages of the present invention will become apparent from a perusal of the following detailed description of a presently preferred embodiment taken in connection with the accompanying drawings.

BRIEF DESCRIPTION OF DRAWINGS

FIG. 5 is a vertical cross-section through a portion of the resealable closure with the push pull pour spout in an opened position;

FIG. 5a is an enlarged partial section of secondary openings;

FIG. 6 is a vertical cross-section through a portion of the resealable closure with the push pull top in a closed position;

FIG. 7 is a perspective view of the resealable closure;

DETAILED DESCRIPTION OF A PRESENTLY PREFERRED EMBODIMENTS

Figure 1:
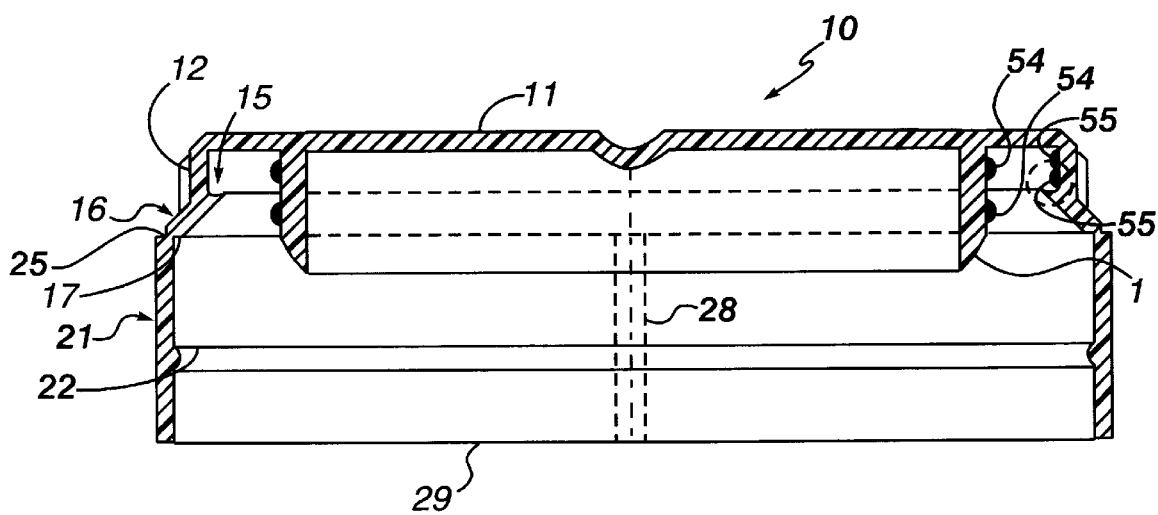
FIG. 1 is a sectional elevation of the closure of the present invention configured with a flat closure disk.
Figure 1A:
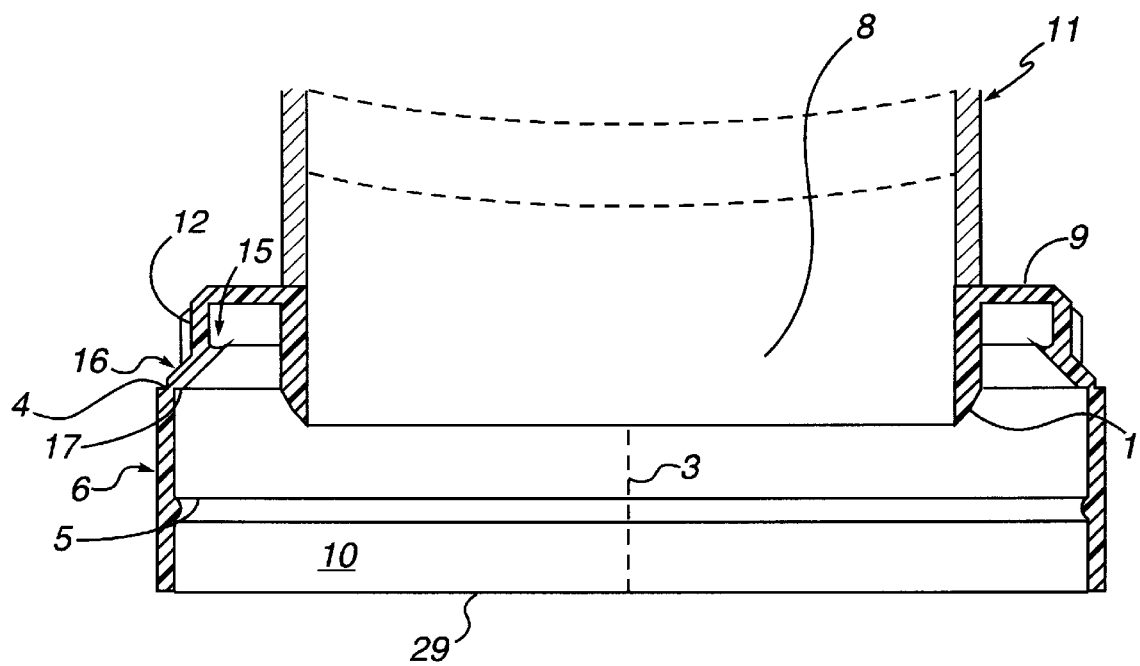
FIG. 1a is a sectional elevation of the closure of the present invention configured with a pour spout.

Referring to FIG. 1, the closure 10 of the present invention is preferably injection molded of low-density polyethylene or polypropylene, but a high density polyethylene may also be used. Closure 10 includes a top disk 9 having a diameter sufficient to encompass the top of the neck and mouth of the container (not shown) to which it is designed to sealingly fit. Depending from the periphery of disk 9 is annular first skirt 12. First skirt 12 has a length determined by the position of the first external locking bead on the neck finish. As shown, first skirt 12 is of a length sufficient to permit first locking member 15 to engage the first or upper annular locking bead on the neck finish of a container. Angularly depending from first skirt 12 is angular sidewall 16. Lower edge 17 of sidewall 16 is of a diameter adequate to accommodate the lower portion of the neck finish of the bottle which the cap is adapted to fit. Preferably, sidewall 16 is angularly offset at an angle between 30° and 60° and more preferably, about 45°.

Figure 3:
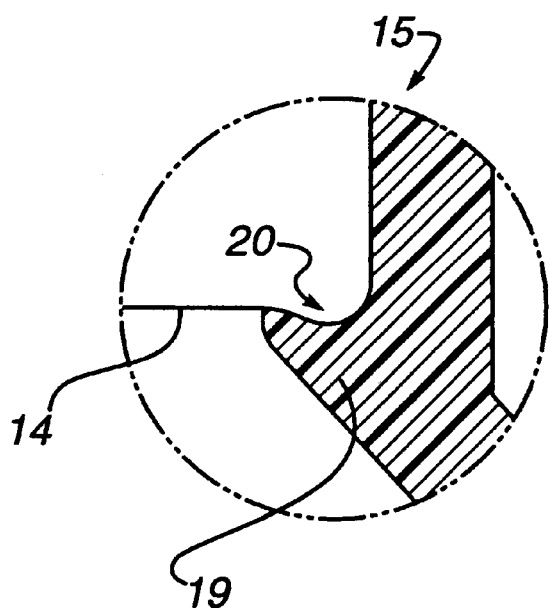
FIG. 3 is an exploded view of the first locking member of the present invention.

As shown in FIG. 3, juxtaposed internally of the intersection formed by the first skirt 12 and sidewall 16 is first locking member 15. First locking member 15 preferably comprises an edge 14 which defines a groove 20 which is formed on radially upwardly extending annular flange 19. Annular flange 19 and/or groove 20 is preferably continuous but can be discontinuous. As can be see in FIG. 3, edge 14 and groove 20 provide a "hook" shape which can for example engage an external upper locking bead on the neck that is of a radius substantially the same as groove 20. Thus, the shape and the radius of groove 20 are preferably selected to engage the bead of the upper locking means on the neck of the container. Because groove 20 is undercut, a mold core must be used that frees or permits removal of undercut prior to stripping the closures from the mold. Various techniques are known to those skilled in the art including the use of movable core sleeves which free the undercut section of the mold. Additionally, the undercut interior of groove 20 can serve as a secondary seal for the closure 10 by shaping its surface to create a space between groove 20 and the container neck exterior (not shown) to permit the collection of liquid and thereby minimize the possibility for leakage of the liquid past edge 14.

Depending from sidewall 16 at its lower bottom edge 17 is second annular skirt 6 which includes second locking member 5. As shown in FIG. 1, second locking member 5 comprises a substantially continuous annular internal bead adapted to engage the second or lower locking bead on the neck finish. While, the second locking member 5 is shown as continuous it may be otherwise configured to be discontinuous or may have a plurality of slightly angularized beads. Alternatively, the locking means may be a groove which accepts the lower locking bead; however, this is not preferred because it does not afford good tamper evidency protection.

The intersection formed between the lower bottom edge 17 of sidewall 16 and the top of second skirt 6 defines first tear line 4. First tear line 4 is characterized by an area of reduced material as is well known in the art. This zone of decreased material provides the ability to easily tear away second skirt 6 from sidewall 16, but prevents removal of closure 10 without tearing away the second skirt 6. A second tear line 3 is provided between first tear line 4 and the bottom edge 2 of second skirt 6.

Figure 4:
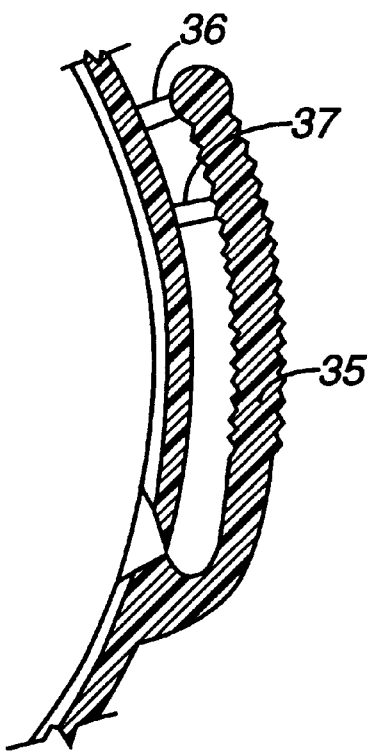
FIG. 4 is an exploded view of the tab member of the present invention.

Referring to FIG. 4, a tear tab 35 is mounted adjacent to but external of second tear line 3 and includes a pair of frangible elements 36 and 37 to maintain tear tab 35 in contact with second skirt 6 prior to being torn away. By pulling tear tab 35 away from the body of the closure member at second skirt 6 frangible elements 36 and 37 will break and the skirt member will begin to disengage by tearing along second tear line 3 and first tear line 4. By completely tearing around the circumference of first tear line 4, second skirt 6 is removed from closure 10.

Figure 2:
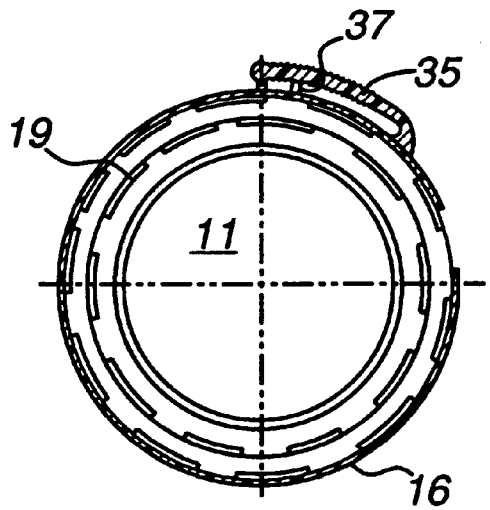
FIG. 2 is a plan view of the bottom of the closure of the present invention.

Referring to FIG. 1 and FIG. 2, an annular valve 1 is provided which depends from closure disk 9. Valve 1 is preferably concentrically spaced from first skirt 12 a distance substantially equal to the distance between the mouth of the neck and the outer surface, the space therebetween typically being equal to the inwardly projecting upper flange of the neck. As shown in FIG. 1, valve 1 optionally includes at least one and preferably a plurality of annular sealing beads 54 depending from its outer surface which are compressed against the inner surface of the container neck to form a seal as the closure 10 is snapped onto the container neck to improve sealing engagement between valve 1 and the mating portions of the interior wall of the container neck (not shown). Additionally, the interior surface of depending annular skirt 12 may also be configured with one or more annular sealing beads 55 to improve sealing engagement between annular skirt 12 and the mating portions of the exterior wall of the container neck.

Figure 11:
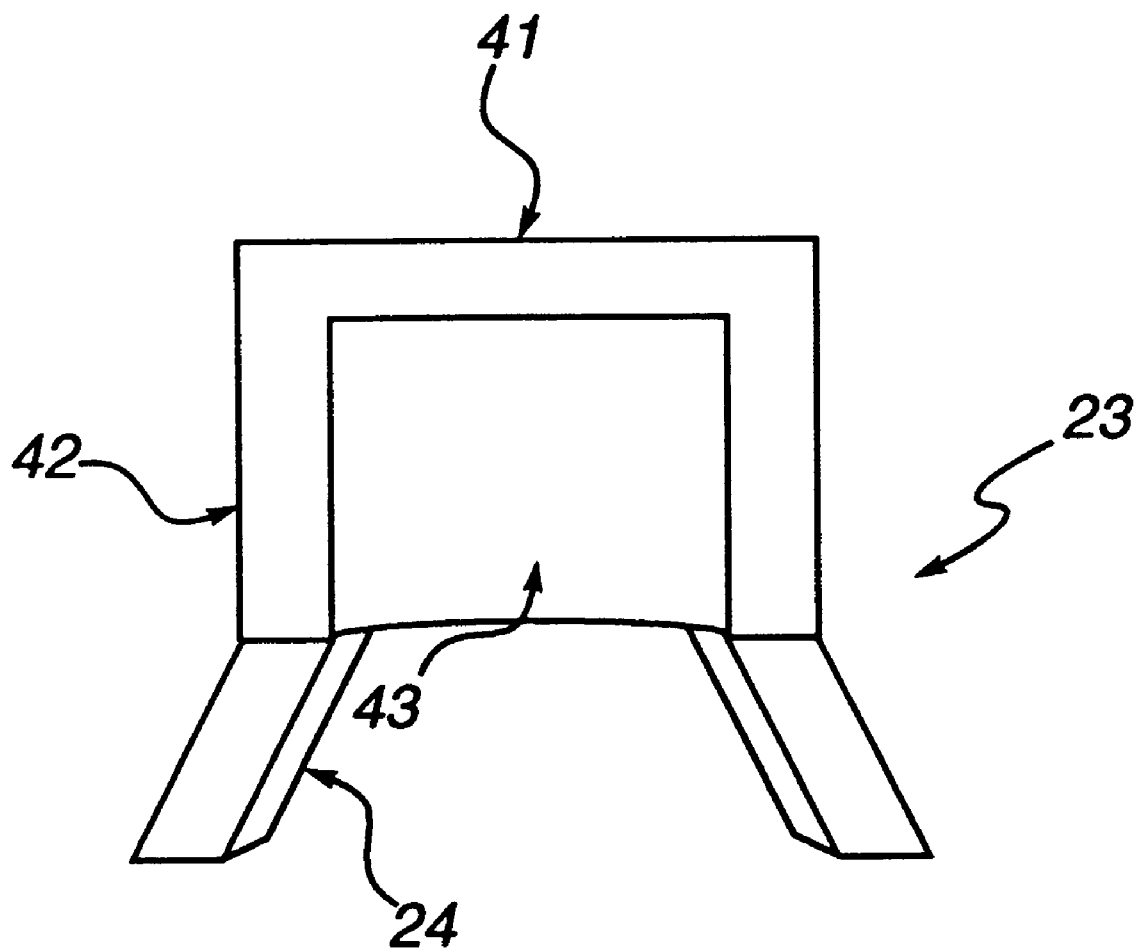
FIG. 11 is an exploded view of the secondary closure plug of the present invention.

Referring to FIGS. 1a, 5, 6 and 7 of the drawings, the top circular disk 9 of closure 10 may be optionally configured with an opening 8 in its center to allow passage of the contents of the container through an opening in a push-pull pour spout assembly 11 positioned thereon, which may be made of high density polyethylene or polypropylene, but which is preferably made of low density polyethylene. Referring to FIG. 5, the opening 8 is preferably formed in the center of the closure disk 9 and positioned for registry with the upstanding cylindrical pour spout body 7. The upper end of the pour spout 7 includes a secondary top portion 21 thereon which is apertured at 22. A closure plug 23 is positioned on the secondary top portion 21 in spaced relation to aperture 22 by a plurality of circumferentially spaced angularly arranged upwardly extending supports 24. Referring to FIG. 11, the plug 23 is formed by a circular closure disk 41 having an integrally molded annular skirt 42 depending from the periphery of the disk 41. The sidewall of skirt 42 is dimensioned to be thin enough to allow inward deformation of the sidewall upon contact with the central opening surface 27 of spout cap 25 while at the same time being thick enough to ensure that the plug 23 will not break off with repeated use. Skirt 42 attaches plug 23 to the angular supports 24 thereby defining a hollow cavity 43 for the plug interior.

The pour spout assembly 11 also includes a push-pull cap 25 is positioned on the upstanding cylindrical pour spout body 7 and has a top surface 26 with a central opening 27 therein which is designed to register with the plug 23 to form a secondary closure when the top cap 25 is in a closed position resting on the secondary top portion 21 of the upstanding cylindrical pour spout 7 as illustrated in FIG. 6. Located on the inner surface of central opening 27 is at least one, but preferably a pair of annular, preferably arcuate, flanges 33 which radially project into opening 27. As shown in FIG. 5a, a pair of annular flanges 33a and 33b are integrally molded with the inner surface of central opening 27 which may be either continuous or discontinuous. A pair of flanges 33a and 33b are especially preferable for sealing fluids such as water. However, a single flange is sufficient for containers used for fluids having a higher viscosity such as fruit juice. The radially projecting flanges 33 engage depending plug skirt 42 to form a leak tight seal for the spout 7. The attachment of skirt 42 to the periphery of disk 41 increases the structural flexibility of the plug 23 thereby forcing the plug skirt 42 to flex and inwardly deform upon engagement with radially projecting flanges 33. This deformation causes a form fit which increases the tightness of the secondary closure seal thereby resulting in a superior leak-tight arrangement when compared to other designs currently in the state of the art.

Figure 8:
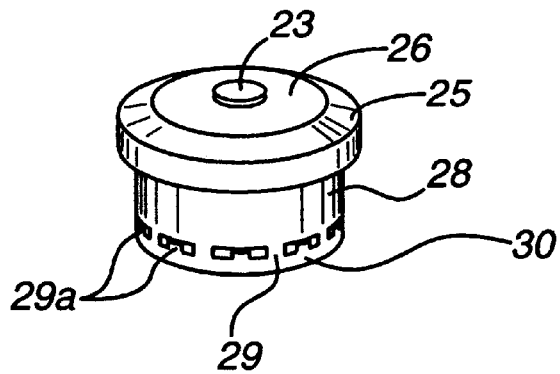
FIG. 8 is a perspective view of a portion of the resealable closure.

Preferably, push-pull cap 25 has a depending cylindrical body member 28 with a plurality of annularly spaced frangible elements 29 connected on its lower perimeter edge to a secondary tamper indicating band 30. The cylindrical body member 28 has a pair of vertically spaced internal annular flanges 31 which slidably engage the outer surface of the upstanding cylindrical pour spout 7. The secondary tamper evident band 30 also has an internal annular flange 32 which is slidably engaged at the exterior of the upstanding cylindrical pour spout 7. The upstanding cylindrical pour spout 7 has two outwardly extending annular flanges 34a and 34b, respectively on the exterior thereof. The internal annular flange 32 is oppositely disposed with respect to the secondary top portion 21 and outwardly extending flange 34a, said outwardly extending flange 34a being positioned above the closure disk 9 of the cap 10 and being oppositely disposed to and between the annular flanges 31 on the cylindrical body member 28 and the secondary tamper evident band 30, respectively. As shown in FIG. 8, the secondary-tamper evident band 30 may contain elevated bridge portions 29a extending from and/or between frangible elements 29. Each of the bridge areas 29a provides support for the secondary tamper-evident band 30 during the closure capping process on the bottle neck portion by preventing excessive vertical deformation and movement of the secondary tamper-evident band 30 against the base depending cylindrical body member 28 of the push-pull cap 25, which would otherwise break the frangible elements 29 prematurely, since the elevated bridges 29a act as stops against the depending cylindrical body member 28. The same protection of the tamper-evident band 30 is apparent during molding of the closure at a time when the frangible elements 29 can be readily damaged when stripped from the mold. The purpose of attaching frangible elements 29a to the elevated bridge areas 29a of the secondary tamper-evident band 30 is to assist in preventing axial misalignment of the secondary tamper-evident band 30 relative to the depending cylindrical body member 28 upon subjecting the closure to torquing forces during assembly to the container neck.

In assembled form as illustrated in FIGS. 5, 6, 7 and 10 of the drawings, the secondary tamper evident band 30 is joined by the frangible elements 29 to the cylindrical body member 28. The push-pull cap 25 is incapable of moving upwardly due to the interengagement of the internal annular flange 32 with the outwardly extending flange 34a on the cylindrical pour spout 7. Thus the cylindrical body member 28 of the push-pull cap 25 is incapable of vertical movement such as required to move the apertured top surface 26 above the plug 23 until sufficient force is applied to the push-pull cap 25 to break away the frangible elements 29 whereby the push-pull cap 25 can move to the position illustrated in FIG. 5 of the drawings wherein the opening 27 therein moves upwardly and away from the plug 23. The internal annular flanges 31 on the cylindrical body member 28 cannot move above the outwardly extending annular flange 34b on the upstanding cylindrical pour spout 7 so that the push-pull cap 25 cannot be removed therefrom.

Figure 12:
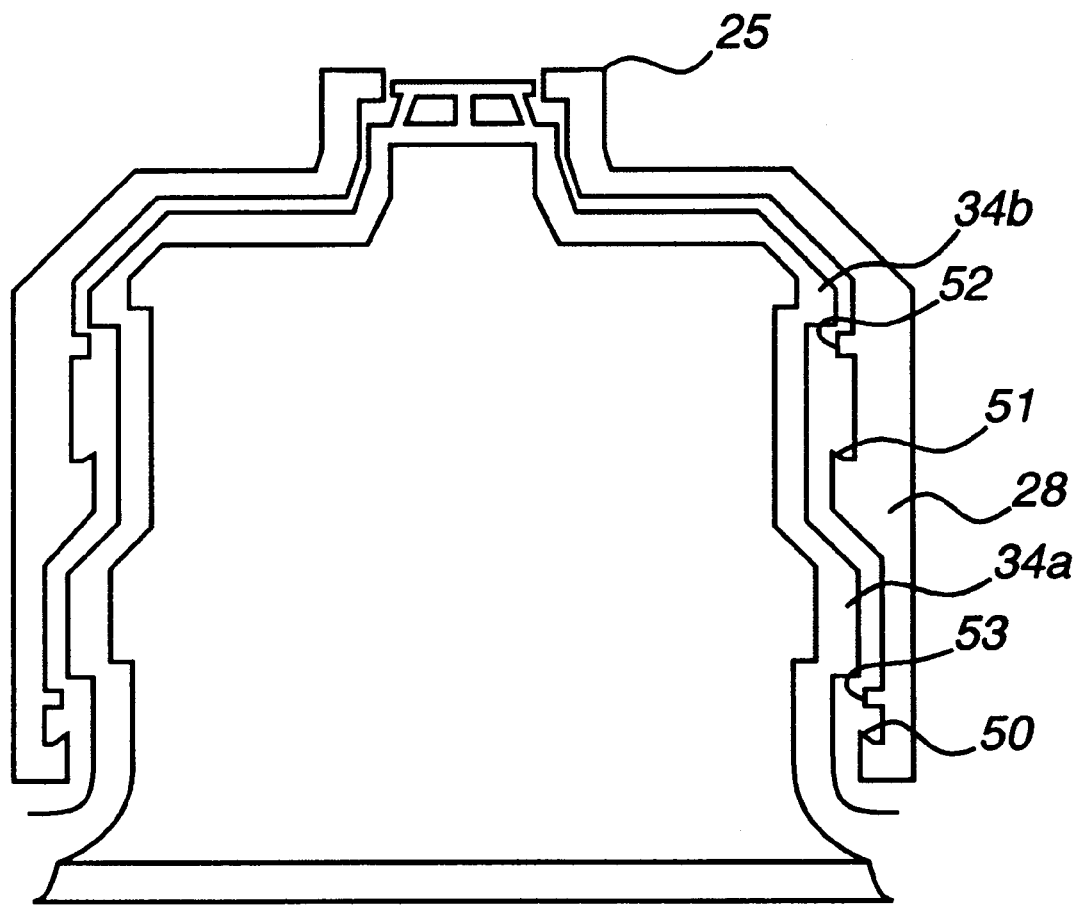
FIG. 12 is a vertical cross-section through a portion of a resealable push-pull pour spout and closure showing locking beads on the pour spout configured to engage locking beads on the pour spout closure.

As shown in FIG. 12, flanges 31 and 32 on the cylindrical body member 28 of the pour spout closure 25 can be replaced with one or more continuous or discontinuous lower locking beads 50 and/or 51. Beads 50 and 51 may be conventionally shaped or may optionally be provided with upturned hook-like edges, similar in construction to the hook-shaped flange 16c on the tamper evident band 15, to engage complimentary shaped surfaces on pour spout flanges 34a and/or 34b to make it more difficult to disengage the push-pull cap 25 from the pour spout 20 as the push-pull cap 25 is moved from the closed to the open 20 position. Additionally, the cylindrical body member 28 of the push-pull closure 25 may optionally be provided with one or more continuous or discontinuous upper locking beads 52 and/or 53, positioned to engage pour spout flanges 34a and/or 34b to prevent inadvertent opening of the push-pull cap 25 while in the closed position.

Figure 9:
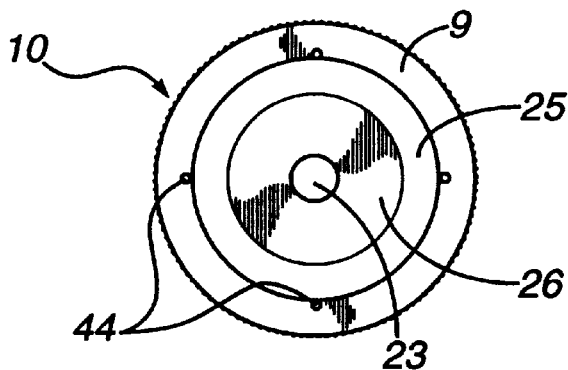
FIG. 9 is a top plan view of the resealable closure.
Figure 10:
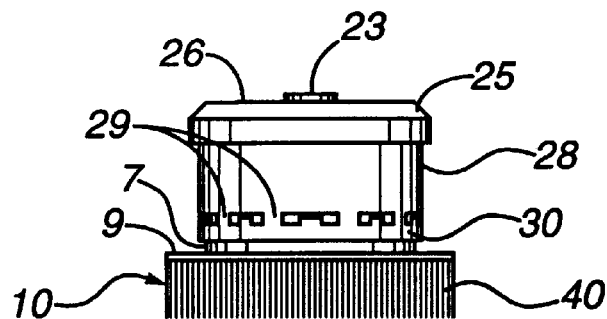
FIG. 10 is a side elevational view of the resealable closure.

As shown in FIGS. 5 and 9, a plurality of circumferentially spaced dimples 44 optionally extend from the exterior wall of the pour spout 7. Dimples 44 facilitate breaking the frangible elements 29 connecting the tamper evident band 30 to the spout closure 25. Dimples 44 can break the frangible elements 29 by either axial or rotational movement of the spout closure 25 relative to the pour spout 7. Referring to FIGS. 7 and 10 of the drawings, the push pull closure 10 is seen in assembled condition as hereinbefore described in FIGS. 5 and 6 illustrating an optional outside rib surface 40 on the depending first skirt 12.

Figure 13:
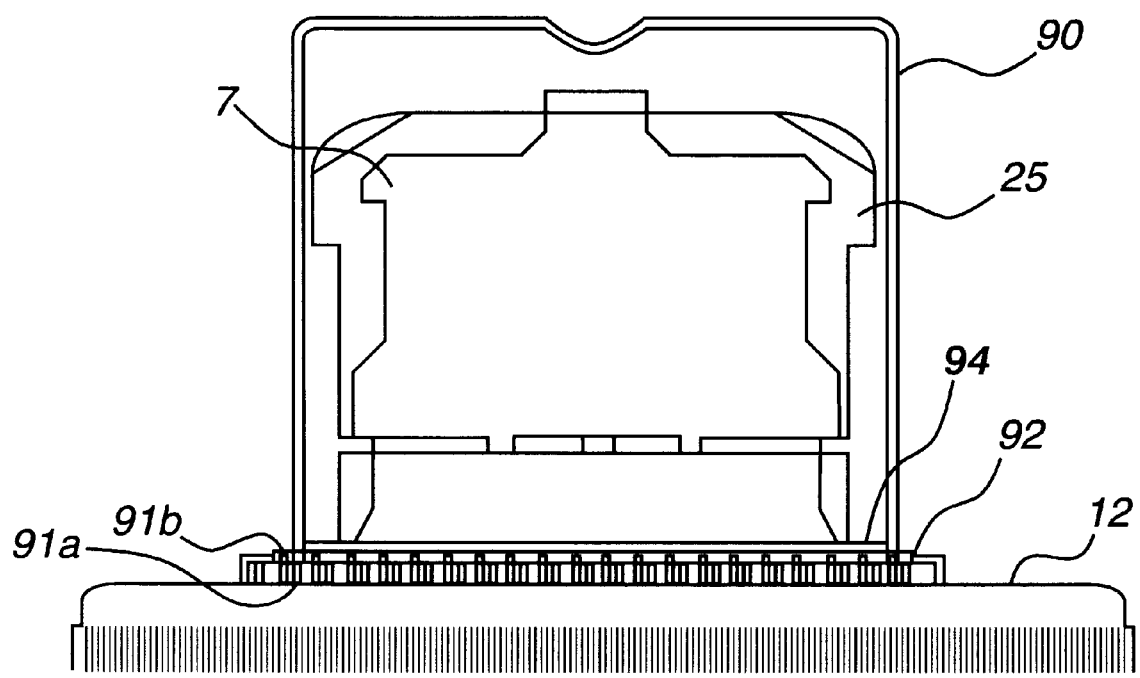
FIG. 13 is an exploded view of the resealable push-pull pour spout closure with tamper evident dust cover installed.

As shown in FIG. 13, the present invention also optionally provides a dust cover 90 which encloses the push-pull pour spout closure when inserted on the container. The dust cover 90 may be optionally provided with an integral ratcheted tamper-evident sealing band 91 in which teeth 91b engage teeth 91a integrally formed on the top of closure seal disc 12. Alternately, dust cover 90 may be provided with a tamper-evident sealing band containing at least one bead 94 for engaging a structure on the closure such as for example at least one bead integrally formed on the top of closure seal disc 12, wherein said beads may be either continuous or discontinuous around their circumference. Tamper-evident sealing band 91 remains intact upon initial installation of the dust cover 90 onto the container. Dust cover 90 and tamper-evident band 91 are separated by the breaking of an line of weakness 92 formed at the intersection of the dust cover 90 and tamper-evident band 91. The purpose of the dust cover is to provide an indication of whether the push-pull pour spout closure has been exposed subsequent to the sealing of the container. When a dust cover 90 used with a tamper-evident sealing band 91, the use of a band 30 on the lower edge of the pour spout push-pull cap 25 for providing tamper-evidency is no longer necessary and may optionally be eliminated.

While presently preferred embodiments of the invention have been shown and described in particularity, the invention may be otherwise embodied within the scope of the appended claims.

What is claimed is:

1. A closure for a container having a neck with first and second spaced apart external locking means and an opening therethrough, said closure comprising:

a. a closure disk for covering said neck opening;
 b. a first skirt depending from said disk substantially encompassing a position of the neck terminating adjacent said first external locking means, said first skirt having an angularly depending sidewall that intersects at a lower edge of said skirt;

c. a first locking member juxtaposed to and radially inwardly extending from said first skirt, said first locking member having an engaging edge at an angle to a plane normal with said first skirt and positioned to engage said first external locking means;

d. a second skirt depending from said sidewall and forming an intersection therebetween defining a first tear line, said second skirt including a second locking member positioned to engage said second external locking means and a second tear line extending from said first tear line through said second locking member to a bottom edge of said second skirt; and e. a tab fixed to said second skirt and juxtaposed to said bottom edge and said second tear line;

f. an annular valve depending from said disk, wherein said annular valve includes at least one annular flange depending from the outer surface of said valve for engaging the inner surface of said neck to form a seal between said closure and said neck.

2. A closure as set forth in claim 1, wherein said annular valve includes a plurality of said annular flanges.

3. A closure as set forth in claim 1, wherein said first locking member is discontinuous around the inner periphery of said first skirt.

4. A closure as set forth in claim 1 wherein said second locking member is discontinuous.

5. The closure of claim 1, wherein said sidewall has a planar inner surface dimensioned to engage at least a portion of said neck located below said first external locking bead.

6. A closure for a container having a neck with first and second spaced apart external locking means and a first opening therethrough, said closure comprising:

a. a closure disk for covering said first opening and having a second opening positioned for the passage of fluids from said first opening;

b. a first skirt depending from said disk substantially encompassing a position of the neck terminating adjacent said first external locking means, said first skirt having an angularly depending sidewall;

c. a first locking member juxtaposed to and radially inwardly extending from said first skirt and forming a concave groove, said first locking member having an engaging edge formed at the inner periphery of said groove such that said edge and said groove engage said first external locking means;

d. a second skirt depending from said sidewall and forming an intersection therebetween defining a first tear line, said second skirt including at least one second locking member positioned to engage said second external locking means and a second tear line extending from said first tear line through said second locking member to a bottom edge of said second skirt; and e. a tab fixed to said second skirt and juxtaposed to said bottom edge and said second tear line;

wherein said closure disk comprises a push-pull pour spout closure assembly attached to said closure disk and having a third opening positioned for the passage of fluids from said second opening wherein said push-pull pour spout closure assembly comprises:

i. a spout member defining a spout opening and having positioned in spaced relationship thereto a plug with at least one support member defining said relationship, and ii. a slidable secondary closure member for cooperation with said plug, said secondary closure member having a central opening therethrough, wherein said central opening has a diameter substantially the same as that of said plug, said central opening being defined by an inner surface having at least one annular seal flange projecting radially into said central opening for engagement with said plug;

further comprising a cover attached to said closure for enclosing said push-pull pour spout closure assembly, wherein said cover is attached to said closure by a cover tamper indicating ring such that said cover is configured for replaceable installation on said closure.

7. The closure of claim 6, wherein said groove is configured to form a secondary seal for said closure.

8. A closure as set forth in claim 6, wherein said plug comprises a circular disk and an integral depending annular skirt extending from the periphery of said circular disk to attach said circular disk to said support member thereby defining a hollow cavity within said plug.

9. A closure as set forth in claim 6, further comprising an annular wall depending from said secondary closure member having at least one first internally extending annular flange spaced a distance from said secondary closure member greater than the length of the inner surface of said central opening to permit said secondary closure member to slide and disengage said plug to permit a fluid to pass through said central opening.

10. A closure as set forth in claim 9, wherein said spout member includes at least one external flange for engaging at least one said first internally extending annular flange to inhibit removal of said secondary closure member from said pour spout assembly.

11. A closure as set forth in claim 10, wherein said secondary closure member further comprises at least one second internally extending annular flange positioned to engage at least one said external flange to prevent inadvertent movement of said secondary closure member while said secondary closure member is in a closed position.

12. A closure as set forth in claim 11 further comprising at least two said first internally extending annular flanges.

13. A closure as set forth in claim 11 further comprising at least two said external flanges.

14. A closure as set forth in claim 11, further comprising at least two said second internally extending annular flanges.

15. A closure as set forth in claim 9, further comprising a secondary closure tamper indicating ring connected to said annular wall.

16. A closure as set forth in claim 15, wherein said secondary closure tamper indicating ring is connected in vertical spaced relation to said annular wall by a plurality of circumferentially spaced frangible elements.

17. A closure as set forth in claim 16, wherein said secondary closure tamper indicating ring includes a plurality of annularly spaced elevated bridge portions extending axially towards said annular wall, wherein said elevated bridge portions define areas of decreased ring spacing from said annular wall.

18. A closure as set forth in claim 17, wherein at least one said frangible element is connected to said annular wall between two elevated bridge portions.

19. The tamper indicating closure of claim 6, wherein said central opening of said secondary closure member has at least two annular seal flanges.

20. A closure as set forth in claim 6, wherein at least one said seal flange is continuous.

21. A closure as set forth in claim 6, wherein at least one said seal flange is discontinuous.

22. A closure as set forth in claim 6, further comprising a plurality of circumferentially spaced dimples extending from said spout member.

23. A closure as set forth in claim 22, wherein said dimples are spaced equally around the circumference of said spout member.

24. The tamper indicating closure of claim 22, wherein said dimples facilitate breaking a plurality of circumferentially spaced frangible elements connecting a tamper indicating ring to said annular wall.

25. A closure as set forth in claim 6, wherein said secondary closure member has no means for providing tamper evidency.

26. A closure for a container having a neck with first and second spaced apart external locking beads and a first opening therethrough, said closure comprising:
   a. a closure disk for covering said first opening;
   b. a first skirt depending from said disk substantially encompassing a position of the neck terminating adjacent said first bead, said first skirt having an angularly depending sidewall;
   c. a first locking member juxtaposed to and radially inwardly extending from said first skirt and forming a concave groove, said first locking member having an engaging edge at an angle to a plane normal with said first skirt and positioned to engage said first external locking means;
   d. a second skirt depending from said sidewall and forming an intersection therebetween defining a first tear line, said second skirt including at least one second locking member positioned to engage said second locking bead and a second tear line extending from said first tear line through said second locking member to a bottom edge of said second skirt; and
   e. a tab fixed to said second skirt and juxtaposed to said bottom edge and said second tear line;

wherein said closure disk has a second opening positioned for the passage of fluids from said first opening and further comprising a push-pull pour spout closure assembly attached to said closure disk and having a third opening positioned for the passage of fluids from said second opening and wherein said push-pull pour spout closure assembly comprises:
   i. a spout member defining a spout opening and having positioned in spaced relationship thereto a plug with at least one support member defining said relationship, and
   ii. a slidable secondary closure member for cooperation with said plug, said secondary closure member having a central opening therethrough and an annular wall, wherein said central opening has a diameter substantially the same as that of said plug, said central opening being defined by an inner surface having at least one annular seal flange projecting radially into said central opening for engagement with said plug; and further comprising a secondary closure tamper indicating ring connected to said annular wall, wherein said secondary closure tamper indicating ring is connected in vertical spaced relation to said annular wall by a plurality of circumferentially spaced frangible elements, and wherein said secondary closure tamper indicating ring includes a plurality of annularly spaced elevated bridge portions extending axially towards said annular wall, wherein said elevated bridge portions define areas of decreased ring spacing from said annular wall.

27. A closure as set forth in claim 26, wherein at least one said frangible element is connected to said annular wall between two elevated bridge portions.

28. A closure as set forth in claim 26, further comprising a cover attached to said closure for enclosing said push-pull pour spout closure assembly.

29. A closure as set forth in claim 26, wherein said cover is attached to said closure by a cover tamper indicating ring.

30. A closure as set forth in claims 17 or 26, wherein said elevated bridge portions extending from said secondary closure tamper indicating ring are of a known vertical height, and said frangible elements are of a height greater than that of said known height of said elevated bridge portions.

31. A closure as set forth in claims 17, 18, 26, or 27, wherein at least one said frangible element is connected to said annular wall from an elevated bridge portion.

32. A closure as set forth in claims 6 or 29, wherein said cover tamper indicating ring includes ratcheted teeth for engaging ratcheted teeth positioned on said closure.

33. A closure as set forth in claims 6 or 29, wherein said cover tamper indicating ring includes at least one annular bead for engaging at least one annular bead positioned on said closure disk.

34. A closure as set forth in claim 33, wherein at least one of said annular beads is continuous.

35. A closure as set forth in claim 33, wherein at least one of said annular beads is discontinuous.

36. A closure as set forth in claims 1, 6 or 26 wherein said first skirt includes at least one annular flange depending from the inner surface of said first skirt for engaging the outer surface of said neck to form a seal between said closure and said neck.

37. A closure as set forth in claim 26, wherein said first skirt includes a plurality of said annular flanges.

38. The tamper indicating closure of claims 6 or 29, wherein said cover is configured for snap-on installation to said closure.

39. The tamper indicating closure of claims 6 or 29, wherein said tamper indication is provided by a broken line of weakness located in said cover.

40. A closure as set forth in claims 6 or 26, including an annular valve depending from said disk, wherein said annular valve includes at least one annular flange depending from the outer surface of said valve for engaging the inner surface of said neck to form a seal between said closure and said neck.

41. A closure as set forth in claim 40 wherein said first skirt includes at least one annular flange depending from the inner surface of said first skirt for engaging the outer surface of said neck to form a seal between said closure and said neck.

* * * * *